United States Patent
Anderson et al.

(12) 
(10) Patent No.: US 6,196,026 B1
(45) Date of Patent: Mar. 6, 2001

(54) METHOD OF MAKING A GLASS ARRAY PLATE WITH CLOSURE

(75) Inventors: James G. Anderson, Dundee, NY (US); Thierry L. A. Dannoux, Avon (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/259,734

(22) Filed: Mar. 1, 1999

Related U.S. Application Data (60) Provisional application No. 60/079,872, filed on Mar. 30, 1998.

(30) Foreign Application Priority Data

Mar. 18, 1998 (EP) ................................... 98400637

(51) Int. Cl.[7] ......................... C03B 23/203; C03B 23/24; C03B 23/26
(52) U.S. Cl. ........................................ 65/44; 65/67; 65/97
(58) Field of Search .................................. 65/44, 45, 47, 65/65, 67, 97

(56) References Cited

U.S. PATENT DOCUMENTS

| | | |
|---|---|---|
| 651,059 * | 6/1900 | Sievert . |
| 1,589,654 | 6/1926 | Murdock . |
| 2,316,749 | 4/1943 | Powers ....................................... 49/84 |
| 2,410,744 | 11/1946 | Powers ....................................... 154/45 |
| 3,484,327 * | 12/1969 | Denman . |
| 3,649,464 | 3/1972 | Freeman .............................. 195/140 |
| 4,191,039 | 3/1980 | Bradbury ................................. 72/60 |
| 4,234,351 | 11/1980 | Deminet et al. ..................... 136/251 |
| 4,326,872 | 4/1982 | Mitenberger ........................... 65/112 |
| 4,867,315 | 9/1989 | Baldwin ............................... 206/558 |
| 5,118,543 | 6/1992 | McColl ................................. 428/34 |

FOREIGN PATENT DOCUMENTS

| | | |
|---|---|---|
| 39 15920 A1 | 5/1989 | (DE) . |
| 42 09 064 A1 | 3/1992 | (DE) . |
| 44 03 308 A1 | 3/1994 | (DE) . |
| 0 745 564 A1 | 12/1996 | (EP) . |

* cited by examiner

*Primary Examiner*—Sean Vincent
(74) *Attorney, Agent, or Firm*—Thomas R. Beall (57) ABSTRACT

A method of making a glass multiwell plate for use in biological or chemical laboratory applications whereby the plate is formed by a single ribbon of molten glass passing twice over a mold such that the first section of glass takes the form of the mold and thereby forms the wells of the plate while the second section of glass covers the wells and forms a top surface of the plate. Holes are cut through the top surface, above each well to enable access.

5 Claims, 6 Drawing Sheets

METHOD OF MAKING A GLASS ARRAY PLATE WITH CLOSURE

This application claims the benefit of U.S. Provisional Application No. 60/079,872, filed Mar. 30, 1998.

FIELD OF INVENTION

The invention relates to a glass multiple well assay plate for applications in biological or chemical assays.

BACKGROUND OF INVENTION

The relationship between structure and function of molecules is a fundamental issue in the study of biological and other chemical based systems. Structure-function relationships are important in understanding, for example, the function of enzymes, cellular communication, and cellular control and feedback mechanisms. Certain macromolecules are known to interact and bind to other molecules having a specific three-dimensional spacial and electronic distribution. Any macromolecule having such specificity can be considered a receptor, whether the macromolecule is an enzyme, a protein, a glycoprotein, an antibody, an oligonucleotide sequence of DNA, RNA or the like. The various molecules to which receptors bind are known as ligands.

Pharmaceutical drug discovery is one type of research that relies on the study of structure-function relationships. Much contemporary drug discovery involves discovering novel ligands with desirable patterns of specificity for biologically important receptors. Thus, the time to bring new drugs to market could be greatly reduced through the use of methods and apparatus which allow rapid generation and screening of large numbers of ligands.

A common way to generate such ligands is to synthesize libraries of ligands on solid phase resins. Since the introduction of solid phase synthesis methods for peptides, oligonucleotides, and other polynucleotides, new methods employing solid phase strategies have been developed that are capable of generating thousands, and in some cases millions of individual peptide or nucleic acid polymers using automated or manual techniques. These synthesis strategies, which generate families or libraries of compounds are generally referred to as "combinatorial chemistry" or "combinatorial synthesis" strategies.

The current storage format for compound libraries is a 96 well format well plate typically made from polypropylene and having rubber stopper sheets or hot seal covers. Certain processes and chemistries require that chemical reagents (which may be reactants, solvents, or reactants dissolved in solvents) be kept under inert or anhydrous conditions to prevent reactive groups from reacting with molecular oxygen, water vapor, or other agents. Examples of moisture sensitive chemistries include peptide chemistry, nucleic acid chemistry, organometallic, heterocyclic, and chemistries commonly used to construct combinatorial chemistry libraries. The solvent used for storage of synthesized chemicals is typically dimethylsulfoxide (DMSO).

Storage plates made from polymers have the disadvantage of being incapable of withstanding the extreme temperature variations that are sometimes required in combinatorial chemistry reactions and storage (between −20° and 370° C.).

Creating a multiwell plate from glass is a solution to this and other problems that are inherent in using polymers, such as sample interaction with the base polymer making up the plate. Glass, however cannot be injection molded and it is extremely difficult to press a gob of glass into a 96 well plate mold. One method currently used in producing a multiwell plate from glass involves a boring process. In this process, slabs of borosilicate glass conforming to the industry standard 96 well plate footprint are machined such that 96 individual wells are bored into the slab. This approach however is extremely costly.

Another method of making glass well plates involves vacuum thermoforming. By this method, small plates are produced from glass by vacuum thermoforming a thin glass sheet, as described in commonly assigned French Patent application 96-13530. This technique offers well volumes of anywhere from 200 μml to 0.1 μml volume capacity per well. While these volumes may be convenient for high-throughput screening bioassay applications aimed at sample and reagent conservation, they are probably too small for chemical synthesis in organic solvent, the storage of drugs or drug candidates in organic solvent or long term storage where closure is required.

The potential for using sealable multiwell plates made of glass extend beyond use as a storage device for combinatorial chemistry. Glass multiwell plates may also be used for such tasks as: interfacing with instruments, extraction, derivatization, synthesis, and more.

SUMMARY OF INVENTION

It is therefore an object of the present invention to provide a multiwell plate that can be manufactured from glass in a cost effective way. Further, it is an object to provide a method of making a glass multiwell plate that can produce varied and unique well designs. It is another object to provide a glass multiwell plate having wells that can be sealed from the external environment, for example by means of a septa. It is yet another object of the present invention to provide a multiwell plate that can withstand great variations in temperature.

The present invention relates to a method of making a glass multiwell plate for use in biological and chemical assays, experimentation and storage. The method comprises the steps of: delivering and depositing a first length of a molten glass ribbon to a surface of a mold having a mold cavity possessing at least one well-forming depression and a peripheral surface, wherein the first length of ribbon overlies the mold cavity and the peripheral surface; causing the first length of ribbon to substantially conform to the contour of the mold cavity thereby forming at least one well in the first length; delivering and depositing a second length of the molten glass ribbon to the exposed surface of the earlier deposited first length of molten glass ribbon; and, puncturing a hole through the second length and over the approximate center of at least one well thereby forming a series of self contained wells that may be accessed through the hole in the second length.

The glass multiwell plate of the present invention comprises a substantially rectangular plate having a peripheral skirt and formed by a uniform sheet of glass having therein a plurality of wells, each well having sidewalls, a bottom and a top surface, the top surface defining a hole capable of being hermetically sealed by a sealing means such as a multi-plugged rubber mat.

DETAILED DESCRIPTION OF THE INVENTION

Figure 1:
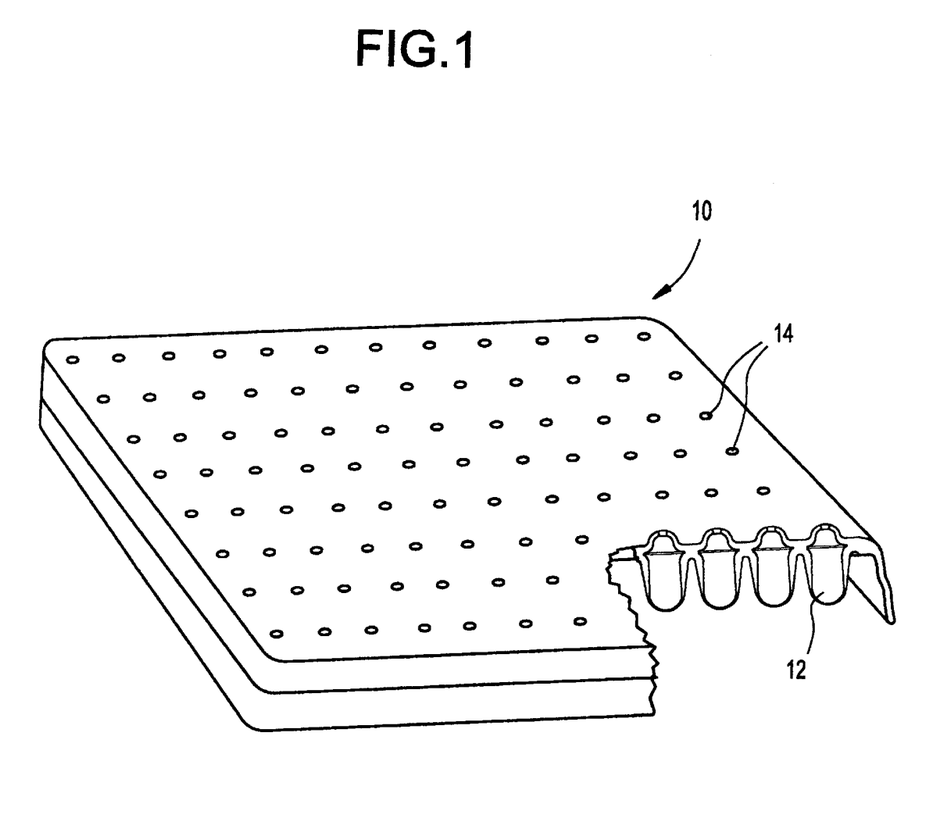
FIG. 1 is a perspective view of the glass multiwell plate of the present invention with a section cut out therefrom.

FIG. 1 illustrates one typical embodiment of a glass multiwell plate capable of being produced using the forming method disclosed herein. The glass plate 10 takes the form of a 96 well plate having a plurality of well openings 14 on the top surface. The dimensions of the plate and spacings between wells 12 preferably conform to industry standards for microplates; that is to say, a plate bordered by a peripheral skirt having 96 wells, each having an approximate volume of 500 $\mu$l and a depth of 12 mm, arranged in an 8×12 matrix (mutually perpendicular 8 and 12 well rows) with a spacing of approximately 9 mm between the center lines of rows both in the x and y directions. The overall height, width, and length dimensions of the plate are preferably standardized at approximately 14 mm, 85 mm, and 128 mm, respectively.

Figure 2:
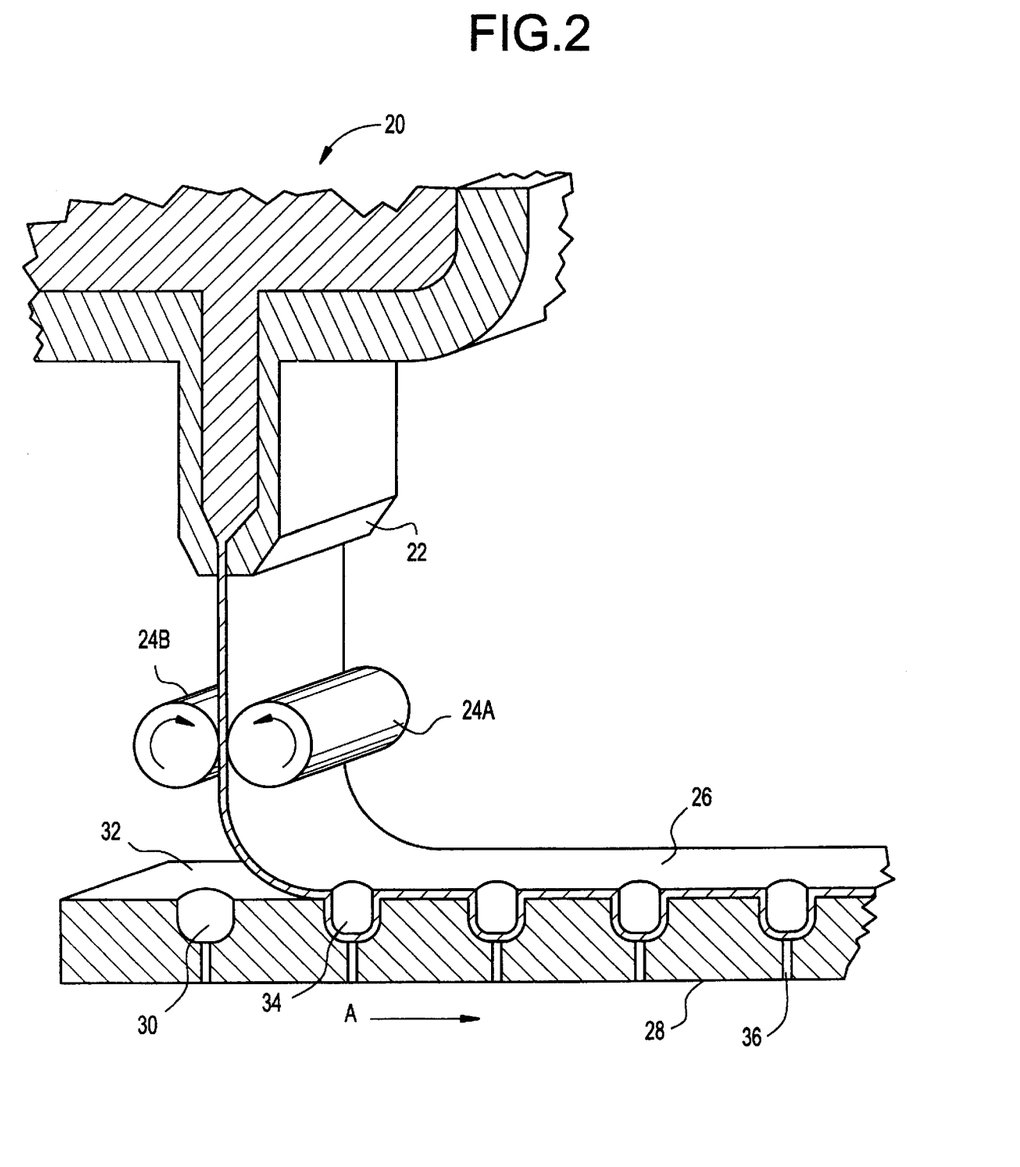
FIG. 2 is a diagrammatic perspective and cutout view of the beginning stages of the instant method of making glass multiwell plates.

Referring now to FIG. 2, illustrated is the apparatus for forming glass plates containing an array of wells. The apparatus is similar to the one disclosed in commonly assigned PCT application PCT/US97/20484, incorporated herein by reference. In general, the instant method comprises the following steps: (a) delivering and depositing a first length of a molten glass ribbon to a surface of a mold having a mold cavity possessing at least one well-forming depression and a peripheral surface, wherein the first length of ribbon overlies the mold cavity and the peripheral surface; (b) causing the first length of ribbon to substantially conform to the contour of the mold cavity thereby forming at least one well in the first length; (c) delivering and depositing a second length of the molten glass ribbon to the exposed surface of the earlier deposited first length of molten glass ribbon; and, (d) puncturing a hole through the second length and over the approximate center of at least one well thereby forming a series of self contained wells that may be individually accessed through the corresponding holes in the second length. The viscosity of the molten glass ribbon at delivery is between about 1000 to 5000 poise so that the following is achieved: (1) the second length of the molten glass ribbon bridges, but does not sag into complete contact with the entire surface of the well of the first length of the molten glass ribbon; and, (2) a hermetic seal is formed between the first and second lengths of the molten glass ribbon wherever they contact.

The actual delivering of the glass ribbon, assuming a product exhibiting two layers, may be accomplished by either using one glass delivery orifice moving a single ribbon over a mold cavity twice, or two separate glass delivery orifices moving different ribbons over the mold cavity. In making a glass multiwell plate, the ribbon thickness should preferably be approximately between 1–3 mm, and more preferably, approximately 2 mm. In the case of making plates from ribbon of such thickness, a simple round orifice would be sufficient.

In the preferred embodiment, referring again to FIGS. 2 and 3, the method will now be explained in greater detail. Molten glass from a common furnace (not shown) and a common "main-line" forehearth 20 is fed to delivery conduit having a glass orifice 22 which thereafter delivers a stream of molten glass to a set of water-cooled rollers 24A/24B. A forehearth temperature control (not shown) allows control of the temperature of the molten glass, which, in turn, allows the glass stream to be delivered at a predetermined and controlled glass viscosity. Water-cooled rollers 24A/24B, rotating in opposite directions, thereafter squeeze the molten glass into a continuous ribbon shape.

Upon exiting the rollers, first length of the molten glass ribbon 26 is deposited upon mold 28 which is moved along a predetermined path, preferably a direction along the mold's width; although, the molten ribbon could be deposited, in a direction along the mold's length. Mold 28, as depicted in FIGS. 2 and 3, is a diagrammatic and perspective cross-section view, cut along a row of wells.

First length of molten glass ribbon 26 is deposited so as to overlie well-forming depression 30 and the surrounding peripheral surface area 32. Once delivered, first length of the molten glass ribbon 26 is thereafter caused to substantially conform to the contour of well-forming depressions 30 resulting in the formation of wells 34 in the first length of the molten glass ribbon 26. First length of the molten glass ribbon 26 is allowed to substantially conform to the contour of well forming depression 22 solely by means of the force of gravity.

In a preferred embodiment, resulting in enhanced and accelerated conformance of the first length of the molten glass ribbon 26 to well forming depression 30, the method involves the additional step of applying a vacuum to the under surface of first length 26. As soon as the complete mold area is covered by first length of the molten glass ribbon 26, a vacuum is applied between mold 28 and first length 26 via a vacuum line (not shown). Vacuum line, attached to a vacuum source (not shown), communicates with a series of vacuum ports 36 which are routed through the mold body itself and open at several locations on the glass surface of the mold, namely at the bottom of well-forming depressions 30. A vacuum may be applied immediately after the first length of the molten glass ribbon is deposited, or such vacuum may be applied immediately after the first length 26 has initially sagged partially within the mold cavity well forming depressions. When the vacuum is applied between the glass and mold, the glass is forced to be in immediate and intimate contact with the mold, allowing the glass to be formed to the desired shape, while also initiating the cooling and hardening of first length of the molten glass ribbon 26.

Figure 3:
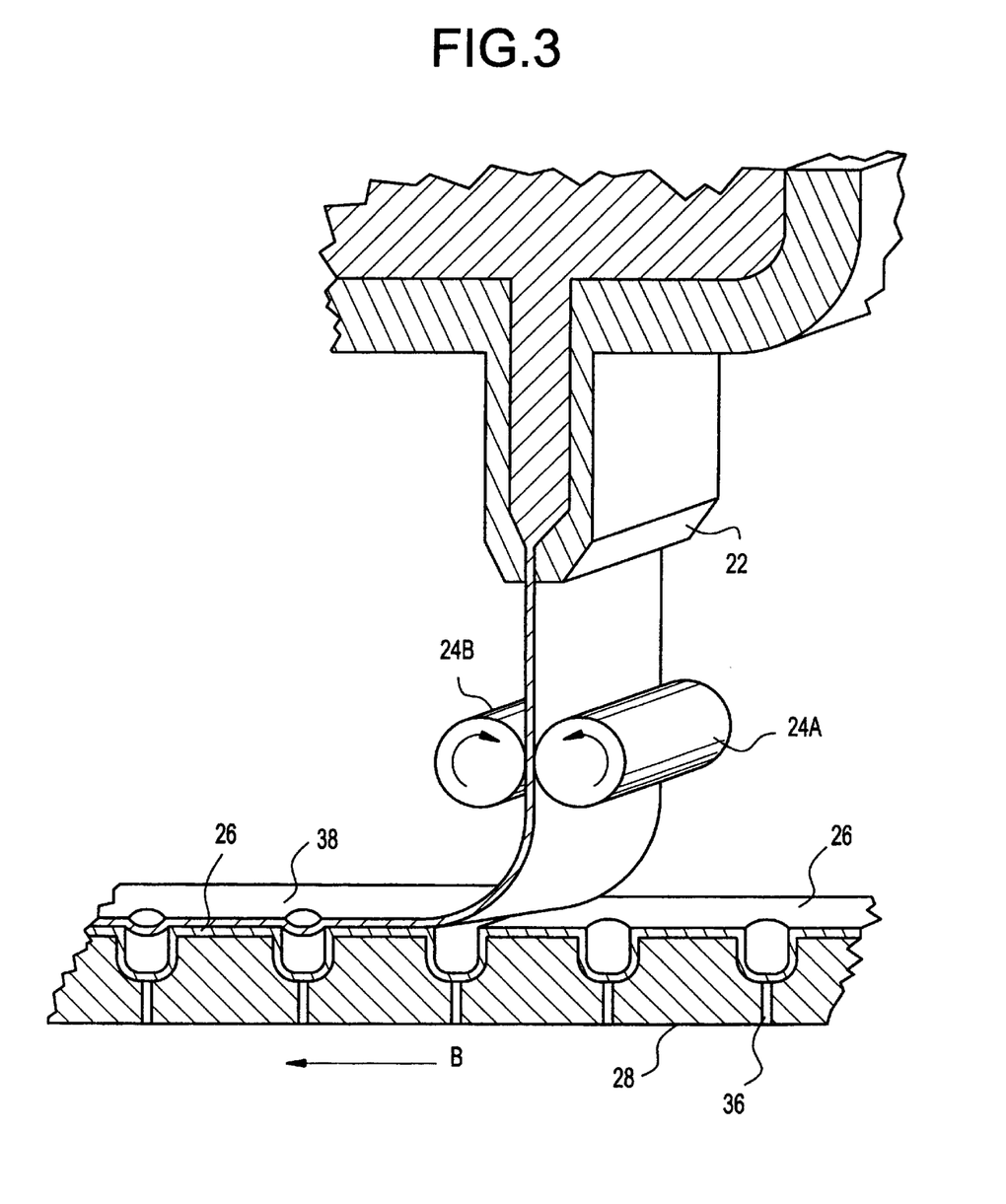
FIG. 3 is a diagrammatic perspective and cutout view of a later, intermediate stage of the instant method of making glass multiwell plates.

Referring now to FIG. 3, following the conformance of the first length 26 to the mold cavity, through either gravity or vacuum forming or a combination of the two, the mold 28 is thereafter moved back along a second predetermined path opposite that of direction A; i.e., direction B. As earlier, the stream of molten glass continues to be delivered from the glass orifice 22 and thereafter to the water-cooled rollers 24A/24B which are rotating in opposite directions with respect to each other. These rollers thereafter squeeze the molten glass into to a continuous ribbon shape, i.e., second length of the molten glass ribbon 38, which is deposited upon and overlies the exposed surface of the first length of the molten glass ribbon 26. Second length of the molten glass ribbon 38 simply lies on the on first length 26, bridging itself across the formed wells due to the relatively low viscosity of the molten glass ribbon. In other words, second length of the molten glass ribbon 38 is essentially folded over and onto first length of the molten glass ribbon 26.

The bulk viscosity, at delivery, of the molten glass of the first and second ribbon lengths should be such that the following is achieved: (1) the second length of the molten glass ribbon 38 bridges, but does not sag into complete contact with, the channel portion of the previously deposited first length of molten glass ribbon 26 and (2) a hermetic seal is formed wherever the first and second lengths of the molten glass ribbon contact; via inherent flow viscosity characteristics of the particular glass. Preferably, the molten glass, at delivery, exhibits a bulk viscosity, of between about 1000–5000 poise.

It follows that the bulk viscosity of the first length of the molten glass ribbon at the time of the deposition of the second length of the molten glass ribbon, is higher than that of the second length due to the working time or cooling which has occurred. Furthermore, a surface-to-mold viscosity gradient is likely to have developed in this first length. However, this first length of the molten glass ribbon should not have been allowed to cool or become so viscous at its surface that the two lengths of the molten glass ribbon can not "set-up" wherever they contact and therefore not form the desired hermetic glass-to-glass seal. Ideally, the bulk and surface viscosities should be maintained such that hermetic sealing detailed above is achieved; i.e., glass viscosities when the second ribbon length is delivered and deposited on the first ribbon length such that a glass-to-glass hermetic seal is formed. Furthermore, it is also necessary to minimize the surface to mold viscosity gradient of the first length so that unnecessary stresses do not build up within the so-formed glass plate. By utilizing rollers and molds which are comprised of a low-conductive material, less heat will be extracted from the surface of the either length of the molten glass ribbon and therefore less of viscosity gradient has developed; mold materials which have been utilized include stainless steel 420, while rollers fabricated of Inconel 718 have been utilized. In addition, the quicker the depositing of the second length of the molten glass ribbon, the less variation in the surface to mold viscosity. In sum, the materials which should be used for the roller and the mold, as well as the cycle time between the ribbon deliveries should be empirically determined by one skilled in the art such that a hermetically sealed glass article exhibiting manageable internal stresses results. Preferably, the mold temperature is approximately 400–600° C. less than the temperature of the glass as it passes the rollers. One final parameter which should be noted: the typical interval between delivery of the first length of the molten glass ribbon and second length of the molten glass ribbon was approximately 1–2 seconds.

Referring to FIGS. 2 and 3, mold 28 has a predetermined shape possessing the design necessary to result in product which meets desired final product specification, i.e., a matrix of wells and a peripheral skirt.

The roller apparatus may have patterns machined into the two rollers 24A/24B for purposes of changing the thickness distribution of the glass ribbon as well for as imparting trade names or numbering, for example, to the surface of the so-formed glass plate.

Figure 4:
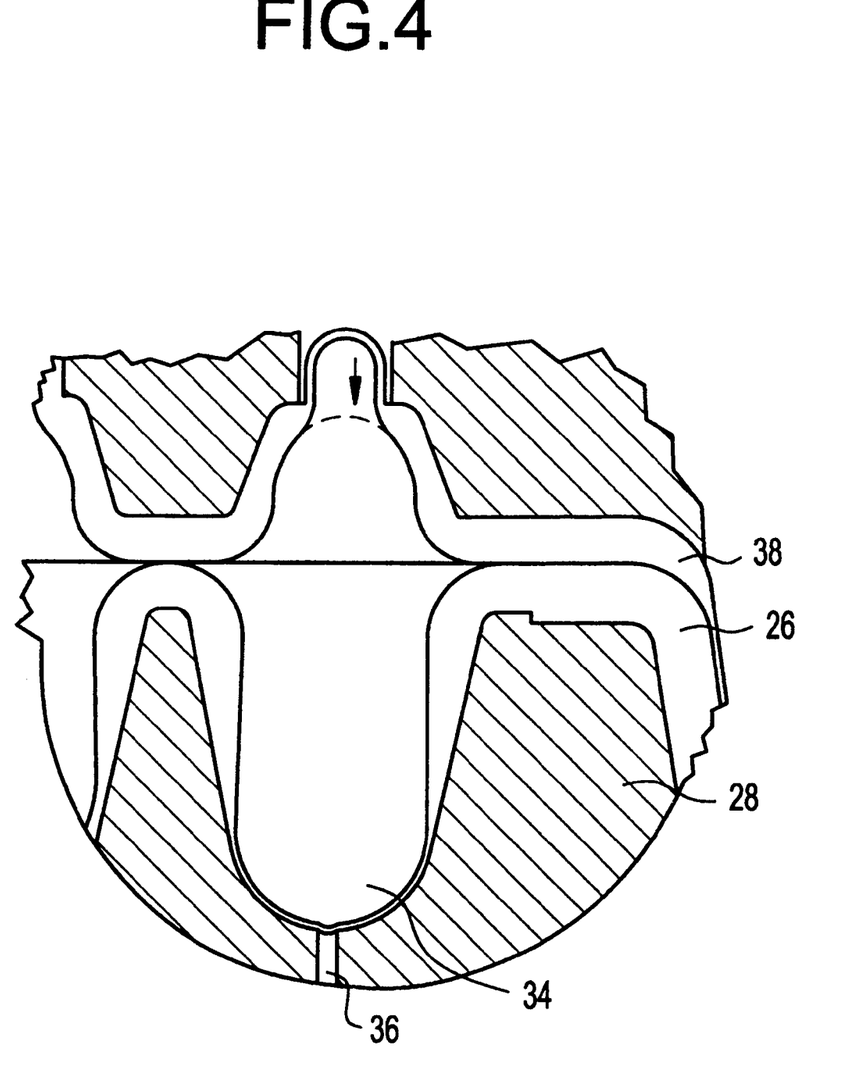
FIG. 4 is a partial cross sectional view of a later stage of the instant method of making glass multiwell plates.
Figure 5:
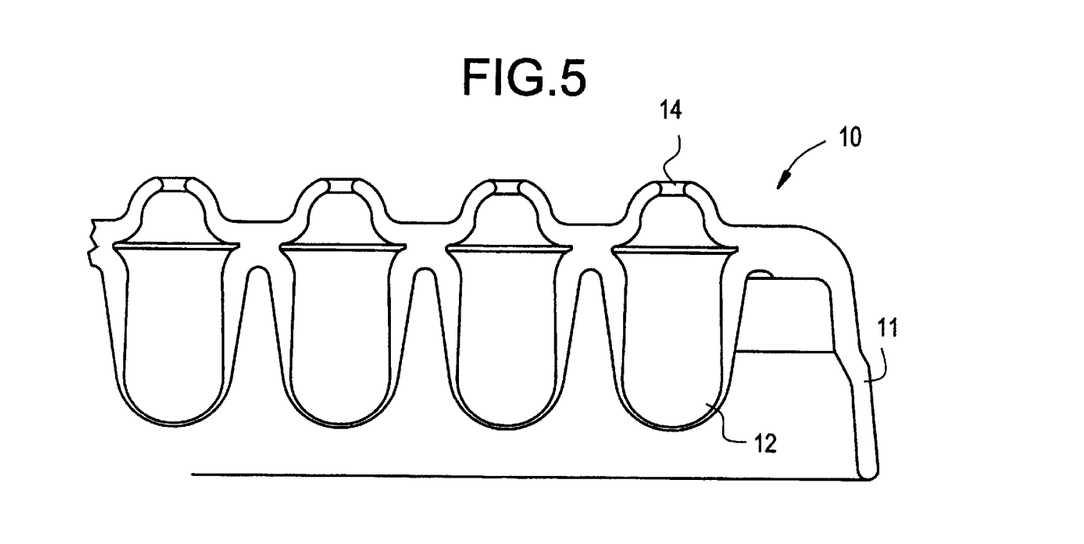
FIG. 5 is a partial cross sectional view of the multiwell plates of the present invention.

The second length of molten glass ribbon 38 preferably is subjected to further forming measures. Preferably, and as shown in FIG. 4, after the second length 38 is deposited onto the first length, an upper vacuum forming head which comprises a plunger having a plurality of indentations aligned in a matrix substantially identical to the matrix of depressions in the mold cavity, is placed in contact with the second length. The plunger assures good glass-to-glass sealing between the respective ribbon lengths in the peripheral area surrounding the wells. A vacuum is applied through vacuum ports that are in fluid communication with the indentations on the plunger. The vacuum serves to pull the second length into contact with the indentations on the plunger. The glass sections that have been pulled into the array of vacuum ports is subsequently sheered off and finished with a corresponding array of gas flame. The sheering may occur while the glass is still in a semi molten state or after the plate has been ejected from the mold. The glass may be sheered off by any of a variety of ways including by flame, water jet, drilling laser, etc. A plurality of wells 12 having an opening 14 of approximately 2 mm is left on the finished plate 10 as shown in FIG. 5, a partial cross section of a glass multiwell plate of the present invention. A peripheral skirt 11 defines the borders of the plate. The finished plate may be inserted into a plastic frame to limit the possibility of breakage.

Around the outer portion of the mold, a peripheral skirt can be formed by properly manipulating the mold design. The peripheral skirt serves to frame and support the plate. Upon completion of the molding operation it becomes necessary to trim the excess glass from the peripheral skirt of the glass plate and thereafter remove the glass plate from the mold. A suitable trimming operation is one which, not only severs the product, supported by the mold, from the excess hot glass surrounding the periphery of the mold, but which results in a positive seal to the outside edges of both glass layers. Two suitable conventional trimming operations, one "male" and one "female", are disclosed respectively in U.S. Pat. No. 4,605,429 (Rajnik) and U.S. Pat. No. 3,528,791 (Giffen); both of which are hereby incorporated by reference. Furthermore, an abrasive water-jet, which removes material by a lapping-type action, or a laser-cutting technique may be utilized in the trimming operation.

The glass multiwell plate disclosed hereinabove is preferably comprised of a transparent glass material, preferably a hard glass exhibiting excellent thermal expansion characteristics selected from the group consisting of soda-lime silicate, borosilicate, aluminosilicate, boro-aluminosilicate and the like. For example, glass envelopes have been produced from Corning Code 7251 glass which consists essentially of the following composition, expressed in terms of weight percent on the oxide: 77.4% $SiO_2$, 5.3% $Na_2O$, 15.4% $B_2O_3$, 1.9% $Al_2O_3$, 0.48 Cl.

The glass multiwell plate that is a product of the above described method comprises a substantially rectangular plate having a peripheral skirt and formed by a uniform sheet of glass having therein a plurality of wells, each well having sidewalls, a bottom and a top surface, the top surface defining a hole capable of being hermetically sealed by a rubber stopper. The plate need not be limited to a 96 well matrix. A plate having any number of wells may be achieved by using the methods described herein. Further, the plate shape need not be limited to rectangular. Conceivably, any plate shape is possible by variations in the mold design.

Figure 6:
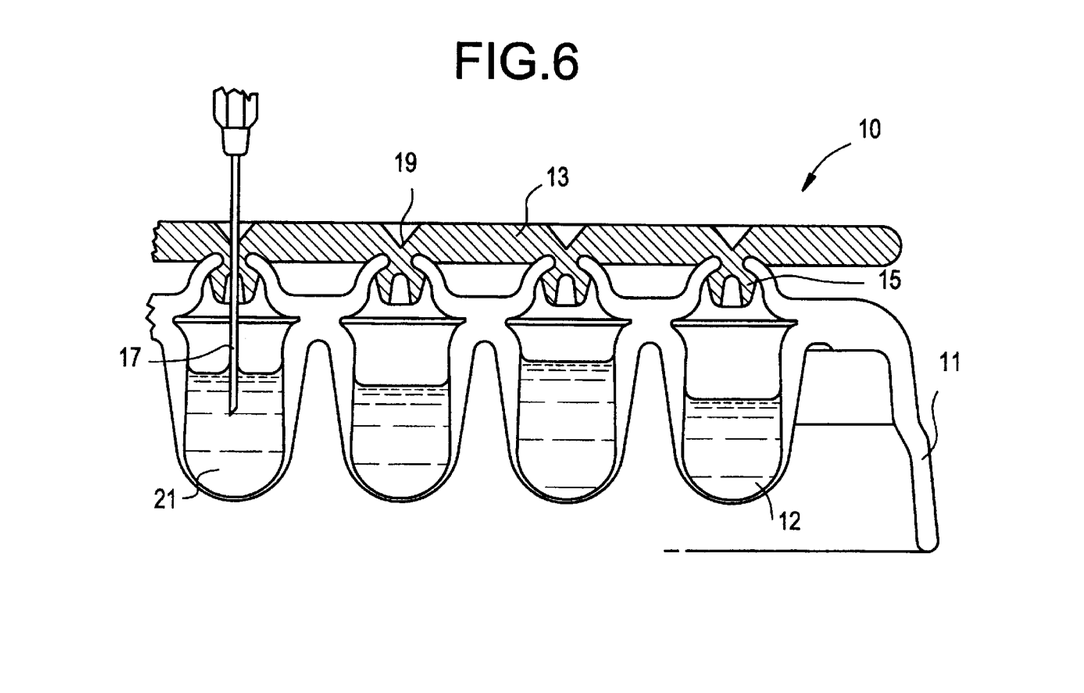
FIG. 6 is a partial cross sectional view of the multiwell plates of the present invention having a sealing mat attached and being accessed by a needle.

FIG. 6 shows a partial cross sectional view of the multiwell plate 10 of the present invention wherein each well 12 is sealed by a molded polymer sealing mat 13 having an array of plugs 15 that conform to the well spacings of the plate. The sealing mat 13 allows access to the wells 12 by means of a hypodermic needle 17 or syringe, for example.

A cone 19 molded into the mat facilitates needle penetration. Liquid sample 21 can remain sealed from the external environment by employing the sealing mat 13 thereby allowing for long term storage with the reduction of evaporation of sample.

Figure 7:
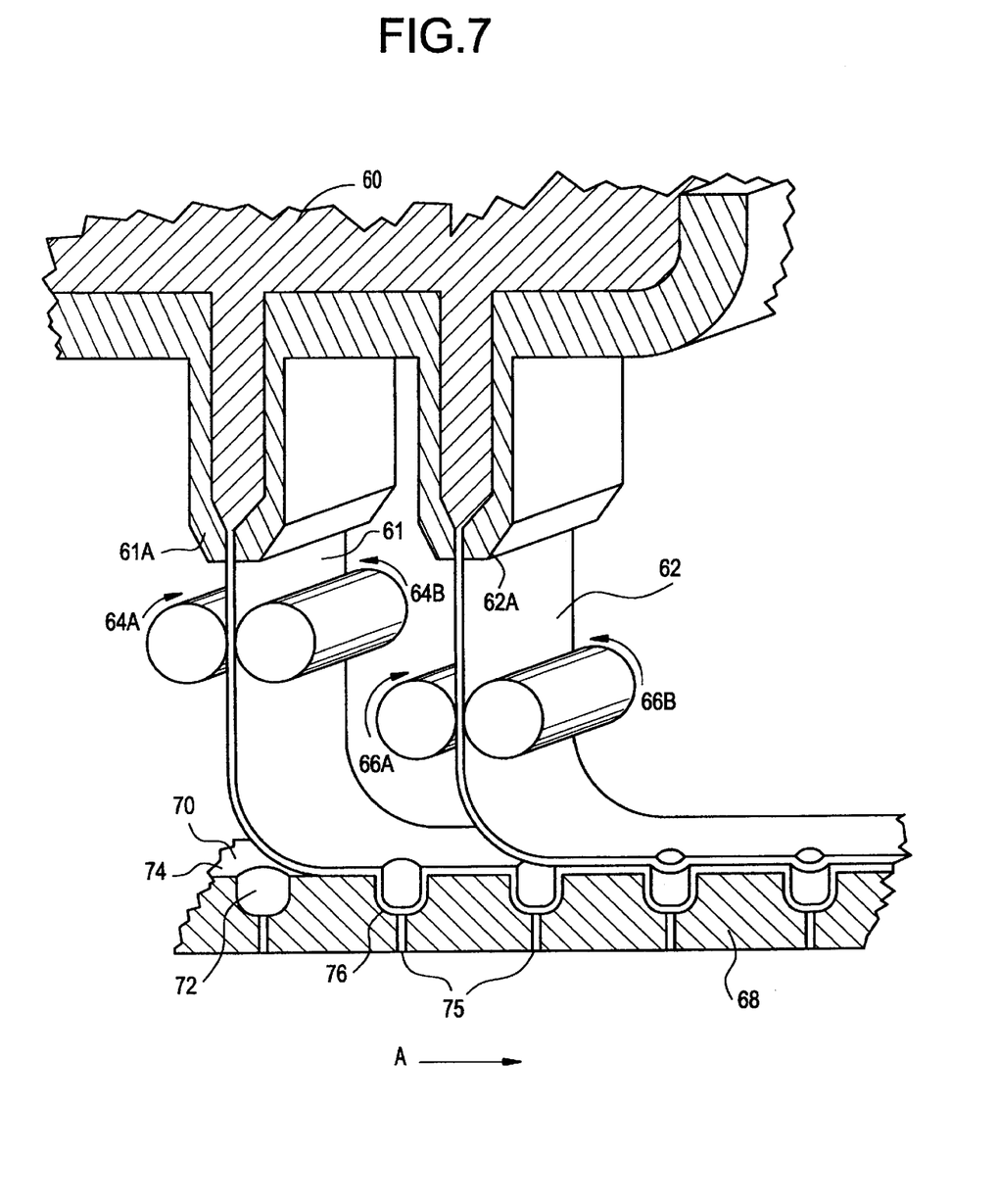
FIG. 7 is a diagrammatic perspective and cutout view of a stage of an alternative method for making the glass multiwell plates of the present invention.

It should be noted that an alternative method for making the multiwell plate of the present invention exists. The alternative method comprises the following steps: (a) delivering and depositing a first or well-forming ribbon of molten glass 21 to a surface of a mold assembly 23 having a mold cavity area 24 possessing at least one well-forming depression 25 formed therewithin and a peripheral surface area 28, wherein the well-forming ribbon 21 overlies the mold cavity area 24 and the peripheral surface 28 areas of the mold assembly; (b) causing the well-forming ribbon 21 of molten glass to substantially conform to the contour of the mold cavity resulting in the formation of a plurality of wells in the ribbon of the molten glass deposited; (c) delivering and depositing a second or sealing ribbon of molten glass 22 to the outer surface of the well-forming ribbon 21 of molten glass wherein the viscosity of the sealing ribbon 22 is such that the sealing ribbon 22 (i) bridges but does not sag into complete contact with the surface of the well of the well-forming ribbon and (ii) forms a hermetic seal wherever the sealing ribbon 22 contacts the well-forming ribbon 21 thereby resulting in a glass plate possessing at least one enclosed well; (d) removing the glass envelope from the mold; and (e) puncturing a hole through the sealing ribbon and over the approximate center of at least one well thereby forming a series of self contained wells that may be accessed through the hole in the sealing ribbon.

Referring to FIG. 7, molten glass from a common furnace (not shown) and a common "main-line" forehearth 60 which is split into a "Y" shaped delivery conduit is delivered to separate orifices 61A and 62A which thereafter deliver respective streams of glass to two sets of water-cooled rollers 64A/64B and 66A/66B. A forehearth temperature control (not shown) could allow each conduit to be controlled separately, thus allowing the molten glass within each conduit to be maintained at different temperatures, therefore allowing two separate molten glass streams to be delivered with different glass viscosities. The first of the two fixed orifices 61A delivers a stream of molten glass to a first set of two water-cooled rollers 64A and 64B, rotating in opposite directions, which thereafter squeeze the hot glass into a continuous ribbon shape upon exiting the rollers. These rollers may be adjusted for the proper spacing, depending upon the desired ribbon thickness for the desired product dimensions. Patterns may also be machined into the rollers for purposes of changing the thickness distribution of the glass ribbon as well for as imparting trade names or numbering, for example, to the surface of the so-formed glass plate.

Upon exiting the rollers 64A and 64B, the well-forming molten glass ribbon 61 is deposited upon mold assembly 68 which is moved along a predetermined path A corresponding to a direction along the mold's width. The mold could be positioned such that the mold assembly is moved, and the ribbon is subsequently deposited, in a direction along the mold's length.

Preferably, the bulk viscosity of this well-forming glass ribbon, as deposited should be about between 2000–5000 poise. The glass ribbon 61 is deposited thereon so as to overlie the mold cavity area 70 containing the well forming depression 72 and the surrounding peripheral surface area 74. Once delivered this well-forming glass ribbon 61 is thereafter caused to substantially conform to the contour of the mold cavity resulting in the formation of a plurality of wells in the delivered ribbon of the molten glass. The channel forming ribbon 61 of molten glass may be allowed to substantially conform to the contour of the mold cavity well forming depressions 72 solely by means of the force of gravity.

As in the previously described method, and in a preferred embodiment, resulting in enhanced and accelerated conformance of the molten glass to the contour of the mold cavity well forming depressions 72 the method may involve the additional step of applying a vacuum through vacuum ports 75 to the under surface of the well forming ribbon of molten glass 61 as described previously. As soon as the complete mold area is covered by the hot glass ribbon, a vacuum is applied between the mold and the channel-forming molten glass ribbon 61 via a vacuum line (not shown) attached to vacuum ports 75 which are routed from the base of each depression in the mold, and attached to the vacuum source (not shown). A vacuum may be applied immediately after the well-forming ribbon of molten glass is deposited, or such vacuum may be applied immediately after the ribbon has initially sagged partially within the mold cavity well forming depressions.

Following the conformance of the well-forming molten glass ribbon 61 to the mold cavity, through either gravity or vacuum forming or a combination of the two, the mold assembly 68 is thereafter further moved along the direction A and thereafter positioned under the aforementioned second set of water-cooled rollers 66A and 66B. As earlier mentioned, a stream of molten glass is directed from the second orifice 62A and thereafter to the water-cooled rollers 66A/66B which are rotating in opposite directions. These rollers thereafter squeeze the molten glass into to a continuous ribbon shape, i.e, sealing ribbon 62, which is deposited upon and overlies the surface of the well-forming molten glass ribbon 61 which has conformed to and is supported by the mold cavity 70 and peripheral surfaces 74. This sealing ribbon of molten glass 62 simply lies on the channel forming ribbon, bridging itself across the formed channels due to the relatively high viscosity of the sealing ribbon.

Specifically, the bulk viscosity of the sealing ribbon 62 of molten glass, as deposited on the well-forming ribbon 61, is such that the sealing ribbon 62 bridges the previously formed well 76 but does not sag into contact with the surface of the well. Furthermore, the temperatures of the respective glass ribbons, well-forming and sealing, are such that the two ribbons hermetically seal together wherever they touch via inherent flow viscosity characteristics of the particular glass used for fabricating the chosen product. Preferably, the bulk viscosity of the sealing ribbon 62 when deposited onto the well-forming ribbon 61 of molten glass is similar to that of the well-forming ribbon as deposited; i.e., a bulk viscosity range between 2000–5000 poise. The well forming ribbon is delivered at a slightly lower initial bulk viscosity in order to compensate for the working time prior to delivery of the sealing ribbon.

As in the earlier described method, the materials which should be used for the roller and the mold, as well as the cycle time between the ribbon deliveries should be empirically determined by one skilled in the art such that a hermetically sealed glass plate exhibiting manageable internal stresses results.

Sealing molten glass ribbon 62 could be subjected to forming and finishing measures for the second length in the single ribbon method as previously described.

It should be further noted that the second length or sealing ribbon (top layer) could be allowed to sag into the respective wells as defined by the first length or the well forming ribbon (bottom layer), respectively, but not so far as to contact the bottom layer. In this embodiment, a series of wells are formed by the top layer and the bottom layer with an envelope of air sealed therebetween. A hole may then be punctured through the top layer such that the envelope of air is in fluid communication with the well as defined by the top layer. Having a design such as this may be useful in certain combinatorial chemistry applications, or for filtering.

Although the now preferred embodiments of the invention have been set forth, it will be apparent to those skilled in the art that various changes and modifications may be made thereto without departing from the spirit and scope of the invention as set forth in the following claims.

What is claimed is:

1. A method of making a multiwell plate made substantially of glass comprising the steps of:

(a) delivering and depositing a first or well-forming ribbon of molten glass to a surface of a mold assembly having a mold cavity possessing at least one well forming depression formed therewithin and a peripheral surface, wherein the well forming ribbon overlies the mold cavity and the peripheral surface of the mold assembly;

(b) causing the well-forming ribbon of molten glass to substantially conform to the contour of the mold cavity resulting in the formation of at least one well in the ribbon of molten glass;

(c) delivering and depositing a second or sealing ribbon of molten glass to the outer surface of the well forming ribbon of molten glass wherein the viscosity of the sealing ribbon is such that the sealing ribbon (1) bridges but does not sag into complete contact with the surface of the at least one well of the well forming ribbon and (2) forms a hermetic seal wherever the sealing ribbon contacts the well-forming ribbon; and, (d) removing the glass article from the mold; and (e) puncturing a hole through the sealing ribbon and over an approximate center of the at least one well thereby forming a series of self contained wells that may be accessed through the hole in the sealing ribbon.

2. The method of claim 1 including the additional step of applying a vacuum to the under surface of the channel forming ribbon of molten glass thereby causing the well forming ribbon to substantially conform to the contour of the mold cavity well forming depression.

3. The method of claim 1 wherein said puncturing step is performed by an array of gas flames.

4. The method of claim 3 wherein the puncturing step occurs while the sealing ribbon is still in a molten state.

5. The method of claim 3 wherein the puncturing step occurs after the piece is ejected from the mold.

* * * * *